United States Patent [19]

Hilterhaus et al.

[11] 4,123,599

[45] Oct. 31, 1978

[54] FOAMS FROM PHENOLIC RESINS AND ISOCYANATES, AND PROCESS FOR THE MANUFACTURE THEREOF

[75] Inventors: Karl-Heinz Hilterhaus, Georgsmarienhütte; Franz G. Reuter, Lemförde, both of Fed. Rep. of Germany

[73] Assignees: Chemie-Anlagenbau Bischofsheim GmbH, Osnabrück; Reuter Technologie GmbH, Lemförde; Metallgesellschaft, Frankfurt am Main, all of Fed. Rep. of Germany

[21] Appl. No.: 726,779

[22] Filed: Sep. 27, 1976

[30] Foreign Application Priority Data

Sep. 26, 1975 [DE] Fed. Rep. of Germany ....... 2542900

[51] Int. Cl.$^2$ ..................... C08G 18/14; C08G 18/50; C08K 3/22; C08K 3/08
[52] U.S. Cl. .................................... 521/123; 521/165; 521/167; 521/901; 521/902
[58] Field of Search ........... 260/2.5 F, 2.5 A, 2.5 AE, 260/2.5 AM, 2.5 AK, 2.5 BF

[56] References Cited

U.S. PATENT DOCUMENTS

| 2,608,536 | 8/1952 | Sterling | 260/2.5 A |
|---|---|---|---|
| 2,806,006 | 9/1957 | Proctor | 260/2.5 AM |
| 2,917,384 | 12/1959 | Grandey | 260/2.5 K |
| 3,385,914 | 5/1968 | Hindersinn | 260/2.5 AM |
| 3,494,966 | 2/1970 | Geering | 260/2.5 AM |
| 3,598,771 | 8/1971 | Davis | 260/2.5 AM |
| 3,632,531 | 1/1972 | Rush | 260/2.5 AM |
| 3,645,923 | 2/1972 | Kan | 260/2.5 BF |
| 3,689,440 | 9/1972 | Glaesmann | 260/2.5 AM |
| 3,751,392 | 8/1973 | Olstowski | 260/2.5 AB |
| 3,943,077 | 3/1976 | Bell | 260/2.5 AK |
| 3,948,824 | 4/1976 | Robins | 260/2.5 AM |
| 3,951,885 | 4/1976 | Thompson | 260/2.5 AK |
| 3,998,766 | 12/1976 | Kan | 260/2.5 BF |

OTHER PUBLICATIONS

Rose, *The Condensed Chemical Dictionary*, 5th Edition; Reinhold publishing Corp.; 1956; pp. 848–849.
Benning, *Plastic Foams: The Physics and Chemistry of Product Performance and Process Tech.*, vol. 1; Wiley Intersci.; 1969; pp. 423–427.

*Primary Examiner*—C. Warren Ivy
*Attorney, Agent, or Firm*—Stevens, Davis, Miller & Mosher

[57] ABSTRACT

This invention relates to a process for the manufacture of foams based on phenolic resins, wherein phenolic resins are reacted, in the presence of metal powders and/or metal oxide powders, with organic diisocyanates and/or polyisocyanates.

5 Claims, No Drawings

FOAMS FROM PHENOLIC RESINS AND ISOCYANATES, AND PROCESS FOR THE MANUFACTURE THEREOF

The present invention relates to foams from phenolic resins and isocyanates and to a process for the manufacture thereof.

It has been known for a long time that, in the manufacture of the so-called phenolic resin foams, fluorohydrocarbons are required as blowing agents for foaming. A serious disadvantage of these known foams is that they are brittle and have inadequate resistance to abrasion. A further disadvantage is the use of fluorohydrocarbons, the use of which must be restricted because of environmental pollution.

According to the invention, it has been found that it is possible to manufacture these so-called phenolic resin foams with improved properties, if the customary blowing agents are dispensed with and, instead, metal powders and/or metal oxides are employed, and the blowing agent effect can be further enhanced if additionally compounds are also used which are capable of reacting with the particular metal oxides.

The invention thus relates to a process for the manufacture of foams, which is characterized in that phenolic resins are reacted, in the presence of metal powders and/or metal oxide powders, with organic diisocyanates and/or polyisocyanates, and to the foams obtainable in this way.

According to the invention, the metal powders and/or metal oxide powders, which are preferably employed, are those which have a certain amphoteric character. Examples of these are vanadium, chromium, manganese, selenium, zinc and aluminum. Aluminum of very diverse particle size and selenium dust and zinc dust as well as oxides thereof are particularly preferred. It is, however, also possible to employ other metal powders or metal oxide powders, for example those of cobalt, nickel and copper. Generally it can be said that the particle size should not substantially exceed 5 $\mu$. The blowing effect is the larger, the smaller the particle diameter. Moreover, it has been observed that the resulting density reaches a minimum when a certain amount of metal powder is added.

It is one of the special properties of the foams manufactured according to the invention that they have an extraordinarily favorable ratio of density:hardness. Thus, for example, a shore-A hardness of about 100 can be reached at room temperatures and at a density of 300 kg/m$^3$. It should be mentioned in particular that this hardness suddenly declines at temperatures of about 100° C and the foam passes into a plastic state in which it can then be readily shaped. After cooling to room temperature the same hardness is regained.

A further advantage which should be singled out is that, in view of the impending restriction on fluorohydrocarbons as blowing agents, as is already practiced in some states of the USA, the new foams manufactured according to the invention do not cause any atmospheric pollution.

The compounds which, according to the invention, are employed as the phenolic resins are largely known, for example from Houben-Weyl: Volume 11/1, pages 731–738 and 755–758; volume 14/2, pages 193, et seq.; U.S. Pat. No. 3,676,392; German Offenlegungsschrift (German Laid-Open Application) No. 23 27 863 and Ullmanns Encyklopädie der Technischen Chemie, volume 13, pages 453 et seq. and also from the literature references cited in these publications.

The phenolic resins which are employed according to the invention thus are not only those which have been manufactured in a known manner from phenol and formaldehyde or from phenol, formaldehyde and a secondary amine, but also those which are derived from phenol derivatives, other compounds with phenolic OH groups, for example naphthol or hydroxypyridine, Mannich bases from diphenols and the like, and those which can additionally be modified, for example by an addition reaction with ethylene oxide, propylene oxide, tetrachlorophthalic anhydride, tetrabromophthalic anhydride and lactones the ring of which is opened during the addition reaction.

The phenolic resins which are preferentially employed according to the invention have an OH number of from 300 to 600, in particular from 540 to 560.

The viscosity of the phenolic resins at room temperature should be such that it permits the desired procedure to be carried out. If necessary, the viscosity can be varied by adding fillers or "diluents," for example polyols of low viscosity, in particular polyethers.

The phenolic resins employed according to the invention are in particular those which have been obtained by a reaction of Mannich bases with epoxides.

At this point, particular attention is drawn to the phenolic resins described in the experiments 1 to 10 which follow. The phenolic resins which, according to the invention, are particularly preferentially employed and have, in particular, an OH number from 540 to 560, are derived from the basic formula

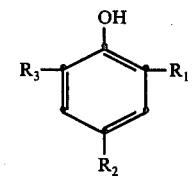

where the radicals $R_1$, $R_2$ and $R_3$ are identical or different and denote

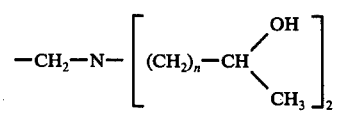

where $n$ represents an integer from 1 to 6.

The isocyanates employed according to the invention include isocyanate compounds which possess at least two isocyanate groups. Preferably, isocyanate mixtures which predominantly contain polyisocyanate compounds with at least three isocyanate groups are employed according to the invention. Examples of these are the isocyanates commercially available under the registered tradenames "Desmodur 44 V" (diphenylmethanediisocyanate) and "PAPI" (polyphenyl polymethylene polyisocyanate; see Saunders & Frisch, Polyurethanes Chemistry and Technology, Interscience 1964, Part II Technology, page 861). The particularly preferentially employed polyisocyanate mixtures include the mixtures of polyisocyanates which contain practically no diisocyanates and monoisocyanates, such as are obtained in accordance with the process described in German Offenlegungsschrift (German Laid-Open Application) No. 2,105,193 corresponding to Friedel et al. U.S. application Ser. No. 221,030, filed Jan. 26, 1972, and now abandoned in favor of a Rule 60 continuation thereof, Ser. No. 737,693, filed Nov. 1, 1976. In this process, an organic polyisocyanate mixture obtained by phosgenation of crude aniline-formaldehyde resins, and predominantly containing the diphenylmethanediisocyanate isomers and higher-functional polyisocyanates with more than two benzene rings in the molecule, is separated into the diphenylmethanediisocyanate isomers and the higher-functional polyisocyanates.

Suitable organic diisocyanates include, for example, aliphatic diisocyanates, aromatic diisocyanates, alicyclic diisocyanates and heterocyclic diisocyanates, for example aliphatic diisocyanates, aromatic diisocyanates, alicyclic diisocyanates and heterocyclic diisocyanates, for example methylenediisocyanate, ethylenediisocyanate, propylenediisocyanate, butylenediisocyanate, cyclohexylene-1,4-diisocyanate, cyclohexylene-1,2-diisocyanate, tetramethylenediisocyanate or hexamethylenediisocyanate, arylenediisocyanates or their alkylation products, such as the phenylenediisocyanates, naphthylenediisocyanates, diphenylmethanediisocyanates, toluylenediisocyanates, di- or tri-isopropylbenzenediisocyanates,aralkyldiisocyanates, such as the xylylenediisocyanates, fluorine-substituted isocyanates, ethylene glycol diphenyl ether-2,2'-diisocyanate, naphthalene-1,4-diisocyanate, naphthalene-1,1'-diisocyanate, biphenyl-2,4'-diisocyanate, biphenyl-4,4'-diisocyanate, benzophenone-3,3'-diisocyanate, fluorene-2,7-diisocyanate, anthraquinone-2,6-diisocyanate, pyrene-3,8-diisocyanate, chrysene-2,8-diisocyanate, 3'-methoxyhexane-diisocyanate, octane-diisocyanate, $\omega,\omega'$-diisocyanato-1,4-diethylbenzene, $\omega,\omega'$-diisocyanato-1,4-dimethylnaphthalene, cyclohexane-1,3-diisocyanate, 1-isopropylbenzene-2,4-diisocyanate, 1-chlorobenzene-2,4-diisocyanate, 1-fluorobenzene-2,4-diisocyanate, 1-nitrobenzene-2,4-diisocyanate, 1-chloro-4-methoxybenzene-2,5-diisocyanate, benzeneazonaphthalene-4,4'-diisocyanate, diphenyl ether-2,4-diisocyanate, diphenyl ether-4,4'-diisocyanate, and polyisocyanates containing isocyanurate groups.

Amongst these diisocyanates, 4,4'-diphenylmethanediisocyanate and/or its 2,4- and/or its 2,2'-isomer, 1,6-hexamethylenediisocyanate, 2,4-toluylenediisocyanate and/or 2,5-toluylenediisocyanate and m-xylylenediisocyanate are preferred.

According to the invention, it is of course also possible to use the NCO preadducts employed for the manufacture of polyurethanes. The NCO preadducts are compounds of fairly high molecular weight which possess at least two terminal NCO groups and which preferably have a molecular weight of from 500 to 10,000 and especially of from 800 to 2,500. Preferably, these NCO preadducts contain from 1.5 to 5% of NCO groups. These NCO preadducts are manufactured in a known manner, by reacting compounds of fairly high molecular weight, containing OH groups, with an excess of polyisocyanate. The manufacture of such NCO preadducts is described, for example, in Angewandte Chemie 64, 523 to 531 (1952), Kunststoffe 42, 303 to 310 (1952), German Patent Specification No. 831,772, German patent specification No. 897,014, German patent specification No. 929,507 and U.S. Pat. No. 3,000,757.

The following may be mentioned as examples of suitable compounds of fairly high molecular weight which contains OH groups and are suitable for the manufacture of the NCO preadducts: polyesters, polyethers, polyesters-amides, polythioesters and polyacetals.

Examples of polyols which can be employed for the manufacture of the NCO preadducts are linear hydroxy-polyesters which contain terminal hydroxyl groups and which have been obtained either by a polycondensation reaction of $\epsilon$-caprolactone or 6-hydroxycaproic acid or by copolymerisation of $\epsilon$-caprolactone with dihydric alcohols or by a polycondensation reaction of dicarboxylic acids with dihydric alcohols.

The hydroxy-polyesters which are employed for the manufacture of the NCO preadducts can also have been manufactured from dicarboxylic acids, or mixtures of dicarboxylic acids, and dihydric alcohols. Suitable dicarboxylic acids include, for example, adipic acid, succinic acid, suberic acid, sebacic acid, oxalic acid, methyladipic acid, glutaric acid, pimelic acid, azelaic acid, phthalic acid, terephthalic acid, isophthalic acid, maleic acid, fumaric acid, citraconic acid and itaconic acid. Suitable dihydric alcohols, or mixtures thereof, which are reacted with the dicarboxylic acids or $\epsilon$-caprolactone to give the desired hydroxy-polyesters, include, for example, ethylene glycol, propylene glycol, butylene glycols, for example 1,4-butanediol, butenediol, butinediol, bis-(hydroxymethyl-cyclohexane), diethylene glycol, 2,2-dimethylpropylene glycol and 1,3-propylene glycol.

The polyols which are preferentially employed for the manufacture of the NCO preadducts include polyesters based on adipic acid, 1,6-hexanediol and neopentyl glycol, having an average molecular weight of approx. 2,000 (Polyol 2002, manufacturer: Polyol-Chemie, Osnabrück, hydroxyl number 56, acid number 1), polyesters based on polycaprolactone having an average molecular weight of 2,000 (Niax Polyol D 560, manufacturer: Union Carbide Corporation) and polyethers of the tradename "Polyol PTMG" from BASF, having an average molecular weight of 2,000.

Fairly high molecular weight compounds with terminal carboxyl, amino and mercapto groups are also suitable. Polysiloxanes which have groups which are reactive towards isocyanates may also be mentioned. Further customary compounds are described, for example, in J. H. Saunders and K. C. Frisch "Polyurethanes" Part 1, New York, 1962, pages 33 to 61, and in the literature cited there.

Any suitable organic diisocyanate can be used for the manufacture of the NCO preadducts, for example the diisocyanates mentioned above.

NCO preadducts with terminal isocyanate groups and containing carbon-carbon double bonds are easily obtainable by using exclusively, or in part, unsaturated polyesters for the manufacture of the NCO preadduct.

Isocyanate compounds which can be employed according to the invention which contain groups which either are ionic groups and/or behave as ionic groups in an alkaline reaction mixture, and the polymerizable compounds which can also be employed, are described, for example, in German Offenlegungsschriften (German Laid-Open Applications) Nos. 23 59 606, 23 59 608, 23 59 609, 23 59 610, 23 59 612, 23 10 559, 22 27 147 and 17 70 384. Amongst these, the isocyanate compounds which are halogenated, preferably chlorinated, and/or sulfonated, are employed preferentially. In part, the German Laid-Open Applications mentioned above also mention isocyanate compounds which do not carry ionic groups. These compounds are also suitable for the purposes of the invention.

Catalysts of a type which is in itself known can also be used, for example tertiary amines, such as triethylamine, tributylamine, N-methyl-morpholine, N-ethyl-morpholine, N-coconut-morpholine, N,N,N'-tetramethylethylenediamine, 1,4-diaza-bicyclo-(2,2,2)-octane, N-methyl-N'-dimethylaminoethylpiperazine, N,N-dimethylbenzylamine, bis-(N,N-diethylaminoethyl) adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole, 2-methylimidazole and, in particular, also hexahydrotriazine derivatives.

Tertiary amines which contain hydrogen atoms which are active towards isocyanate groups are, for example, triethanolamine, triisopropanolamine, N-methyl-diethanolamine, N-ethyldiethanolamine, N,N-dimethyl-ethanolamine and their reaction products with alkylene oxides, such as propylene oxide and/or ethylene oxide.

Further suitable catalysts are sila-amines with carbon-silicon bonds, such as are described, for example, in German patent specification No. 1,229,290, for example 2,2,4-trimethyl-2-silamorpholine and 1,3-diethylaminomethyl-tetramethyldisiloxane.

Further suitable catalysts are nitrogen-containing bases such as tetraalkylammonium hydroxides, alkali metal hydroxides such as sodium hydroxide, alkali metal phenolates such as sodium phenolate, or alkali metal alcoholates such as sodium methylate. Hexahydrotriazines may also be employed as catalysts.

Organic metal compounds, especially organic tin compounds, can also be employed as catalysts according to the invention.

Preferred organic tin compounds are tin-(II) salts of carboxylic acids, such as tin-(II) acetate, tin-(II) octoate, tin-(II) ethylhexoate and tin-(II) laurate, and the dialkyl-tin salts of carboxylic acids, such as, for example, dibutyl-tin diacetate, dibutyl-tin dilaurate, dibutyl-tin maleate or dioctyl-tin diacetate.

Further examples of catalysts which can be used according to the invention, and details of the mode of action of the catalysts, are described in the Kunststoff-Handbuch (Plastics Handbook), volume VII, edited by Vieweg and Höchtlen, Carl Hanser-Verlag, Munich 1966, for example on pages 96 to 102.

The catalysts are as a rule employed in an amount of between about 0.001 and 10% by weight, based on the amount of isocyanate.

In particular, preferred catalysts are those which possess reactive groups, such as hydroxyl radicals and amino radicals, which are able to react with isocyanates and are built into the polymer structure during the formation of the polymer and, where possible, contribute to a cyclization of the isocyanates to give isocyanurates.

Examples of further suitable catalysts are therefore 2,4,6-tris(dimethylaminomethyl)-phenol, methyldiethanolamine, N-methyldipropyldiamine, dibutylaminoethanol, dimethylamino-2-propanol, diethylaminoethoxyethanol and o-tolylpropanolamine. Further suitable catalysts include 1,4-diaza(2,2,2)bicyclooctane (DABCO®, also referred to as triethylenediamine), N,N'-bis-dimethyldiethyl-piperazine, hexamethyltriethylenetetramine, dimethylbenzylamine, catalyst A-1 (UCC), dimethylcetylamine, 1,8-diazabicyclo[5,4,0]undec-7-ene and tetramethyl-1,3-butanediamine.

Particularly suitable catalyst for the purposes of the invention are compounds which can be described as zwitterion compounds, i.e., compounds which contain at least one group having a positive charge and at least one group having a negative charge in the molecule and which preferably additionally contain at least one hydrogen atom which is active according to a Zerewitinow test. The compounds preferentially employed from this group thus includes those of the general formula

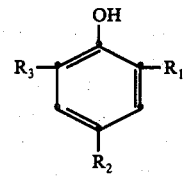

where the radicals $R_1$, $R_2$ and $R_3$ are hydrogen or a radical of the general formula

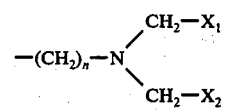

where $n$ is an integer from 1 to 25 and the radicals $X_1$ and $X_2$ are hydrogen and/or alkyl radicals of 1 to 25 carbon atoms, and the radicals $R_1$, $R_2$ and $R_3$ can be different, but not more than two of the radicals $R_1$, $R_2$ or $R_3$ are hydrogen, and the alkyl radicals can carry primary and/or secondary hydroxyl groups.

Amongst these, tertiary amino compounds with a phenolic hydroxyl group, which additionally contain at least one further hydroxyl group are particularly preferred, i.e., tertiary amino compounds of the general formula

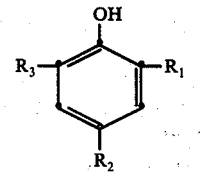

where the radicals $R_1$, $R_2$ and $R_3$ are hydrogen or a radical of the general formula

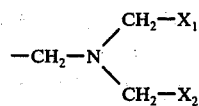

where the radicals $X_1$ and/or $X_2$ are hydrogen, alkyl of 1 to 25 carbon atoms or the radical $-(CH_2)_m OH$ ($m$ being an integer from 0 to 25), but not more than two of the radicals $R_1$, $R_2$ or $R_3$ are hydrogen and at least one of the radicals $R_1$, $R_2$ and $R_3$ must carry a hydroxyl group.

Tertiary amino compounds which are employed preferentially according to the invention, fall under the above general formula and possess zwitterion properties are 2,4,6-tris-(ethyl-2-hydroxyethylaminomethyl)-phenol of the formula

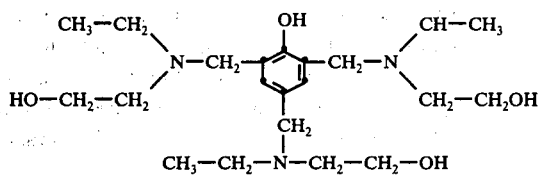

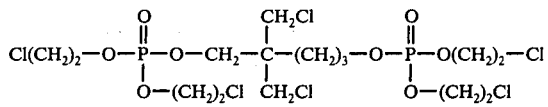

and 2,4,6-tris-(dimethylaminomethyl)-phenol.

Instead of, or together with, the isocyanates described above, it is also possible to employ thioisocyanates with at least two isocyanate or thioisocyanate groups, thiocyanates, selenocyanates and tellurocyanates, or other polymerizable compounds.

In order to form a particularly fine cell structure it is advisable to admix nucleating and cell-regulating substances. Numerous compounds are suitable for use as nucleating substances, examples being finely divided inert solids, for example silicon dioxide or aluminum oxide, if appropriate together with zinc stearate, or amorphous silicic acids or metal silicates.

Suitable cell regulators include silicone oils based on polysiloxanes, for example the oils DC-193, DC-194, DC-195, L-532 and L-5340 from Union Carbide Corporation, the oils SF 1066 and SF 1109 from General Electric, the DC grades of oils from Wacker, Tegiloxan from Goldschmidt and Emulgin 286 from Henkel. Amongst these, DC-195, L-5340 and Emulgin 286 are preferred.

Preferably, surface-active additives are also used when manufacturing the foams according to the invention, so as to facilitate foaming by reducing the surface tension of the system. In addition, the surface-active additives impart certain desirable properties to the foams, through additionally influencing the cell structure. Suitable compounds include, for example, surfactants (commercially available under the name Emulgin 286, manufactured by Henkel) as well as the non-ionic alkylphenol oxyethylates having a degree of oxyethylation of about 6 to 20. The use of Emulgin 286 and of alkylphenol oxyethylates having a degree of oxyethylation of 9 to 10 is preferred.

The surface-active additives can at the same time also act as foam stabilizers. In addition, the following may be employed as foam stabilizers: silicone oil (commercially available under the name Si L 5340, manufactured by Union Carbide Corporation) and Emulgin 286 from Henkel.

In order further to increase the non-flammability of the foams of the invention, varying amounts of fire-retardant substances can be added to the system. These substances can be dissolved or dispersed in one or both components. The fire-retardant substances which are soluble in the aqueous component include, for example, trisodium phosphate.12 $H_2O$. The insoluble fire-retardant additives which furthermore at the same time act as reinforcing agents include, for example, kieselguhr (diatomaceous earth), hydrated aluminum oxide, magnesium silicate, asbestos powder, chalk, asbestos fibers and glass fibers.

Particularly suitable organic flameproofing agents are compounds based on phosphorus and halogen, for example the compounds described in the experiments which follow and the compound of the formula sold by Monsanto under the name "Phosgard 2xc20." This compound contains about 35% of chlorine and about 11% of phosphorus. It is inert towards NCO groups. The particular advantages of this phosphonate ester are that the viscosity of very viscous polyisocyanate materials can be lowered substantially by mixing with this phosphonate ester and that the material is emulsifiable in water if suitable emulsifiers are used. The fire-retardant properties are not only attributable to the relatively high phosphorus content and chlorine content, but also to the increase in the oxygen index which — on exposure to a flame — causes a hard charred layer to be produced immediately, which does not propagate the flame further. In addition to the flameproofing properties, the ester serves the purpose of providing, by means of the P and Cl atoms, certain fungicidal actions.

in principle the polymers of the invention can be filled with substantial amounts of fillers without losing their pattern of high-performance properties.

The fillers to be employed and the inert adjuvants can, before mixing, also be steeped in, or impregnted or sprayed with, one of the liquid components of the mixture, for example in order to improve the adhesion or flow.

The amount of additives introduced depends above all on the viscosity of the mixture. Preferably, the amount of additives introduced is between 0.1 and 20% by weight, relative to the weight of the reaction mixture employed. In addition to these fire-retardant additives or fillers, it is, of course, possible also to add pigments or dyes to the mixture which is to be foamed, if colored products are desired.

Further examples of surface-active additives and foam stabilizers, cell regulators, reaction retarders, stabilizers, fire-retardant substances, plasticizers, dyes, fillers, fungistatic materials and bacteriostatic materials, which, according to the invention, are added optionally, and details regarding the method of use and mode of action of these additives, are described in the Kunststoff-Handbuch (Plastics Handbook), Volume VI, edited by Vieweg and Höchtlen, Carl Hanser-Verlag, Munich 1966, for example on pages 103 to 113.

Depending on the properties which the foams according to the invention are to exhibit, it is possible to employ, as additional reactants, polyesters and polyethers, such as are employed in polyurethane chemistry, and such as have, in part, already been described above in conjunction with the manufacture of the NCO preadducts which can be employed according to the invention. Since the polyols, that is to say the polyesters and polyethers, have been described in great detail in the polyurethane literature, a closer description of these compounds will be dispensed with here.

A further interesting subject of the present invention comprises the electrically conductive foams. When manufacturing foams, electrically conductive particles, in an amount which result in an electrically conductive foam, are introduced, in addition to the adjuvants already mentioned. Metal powders, inert particles coated with noble metals, for example metallized glass beads, plastic particles which have been rendered electrically conductive, particles of electrically conductive plastics and the carbon blacks and graphites conventionally used in the manufacture of electrically conductive plastics can be employed as electrically conductive particles. Of course, mixtures of the abovementioned substances can also be used.

The components mentioned above can be mixed in the manner known from polyurethane chemistry. As usual, a component A and a component B are first prepared, and these are then mixed after addition of appropriate adjuvants and catalysts. The start time of the mixtures, for the production of foams, prepared in this way is in general between 5 seconds and 100 seconds or more, and can be regulated as desired. If required, the components can be warmed to reduce the start time. Preferably, the foams according to the invention have a density of between 15 and 750 kg/m³.

For special applications it can be of advantage if the foams obtained according to the invention are subjected to a subsequent heat treatment at temperatures above 100° C, especially above 130° and up to 250° C. The experiments 1 to 10 which follow demonstrate the manufacture of phenolic resin components which, according to the invention, are preferentially employed as the polyol components.

Experiments 5 and 6 describe the manufacture of phosphonate esters which, in combination with the phenolic resins, give a flameproofed resin.

EXPERIMENT 1

Basic recipe for the phenolic resin component which, according to the invention, is preferentially employed materials employed and amounts:

| | Moles | Batch parts by weight | Parts by weight 100 |
|---|---|---|---|
| Phenol | 1.000 | 94.11 | 8.73 |
| Diethanolamine | 3.025 | 318.05 | 29.50 |
| Formaldehyde 35% strength | 3.025 | 259.54 | 24.07 |
| Propylene oxide | 7.000 | 406.56 | 37.70 |
| | | 1,078.26 | 100.00 |
| Distillate (diethanolamine, formalin and water) | | −226.13 | |
| Yield | | 852.13 | |

Phenol and formaldehyde are first introduced, together with 1.25 parts by weight of glacial acetic acid, into a stirred reactor equipped with cooling and heating means. The exothermic reaction is controlled by slowly metering in the amine. The reaction is then allowed to continue under reflux for approx. 1 hour. During this period, the product becomes discolored and the viscosity rises. The water formed and the excess amine and formaldehyde are then distilled off.

Under a blanket of nitrogen and at a temperature of 130° C, the propylene oxide is then added dropwise in such a way that a controllable reflux can be observed in the reflux condenser. The reaction has ended when the reflux in the condenser ceases.

A brownish resin having an OH number of 525 and an alkaline reaction is obtained.

EXPERIMENT 2

A more advantageous recipe becomes possible when paraformaldehyde is employed. In this case, the reaction can be carried out in the melt; consumption of energy for distilling the water from the formaldehyde is thus dispensed with.

Materials employed and amounts:

| | Moles | Batch parts by weight | Parts by weight 100 |
|---|---|---|---|
| Phenol | 1.000 | 94.11 | 10.35 |
| Diethanolamine | 3.025 | 318.05 | 34.96 |
| Paraformaldehyde | 3.025 | 90.84 | 9.99 |
| Propylene oxide | 7.000 | 406.56 | 44.70 |
| | | 906.56 | 100.00 |
| Distillate (water, diethanolamine and formaldehyde) | | −57.43 | |
| Yield | | 852.13 | |

The calculated amounts of phenol and paraformaldehyde are melted, under a blanket of nitrogen, in a stirred reactor which can be heated and cooled. The exothermic reaction is initiated by passing in the diethanolamine in a controlled manner. The further procedure is as described in Experiment 1. A reddish-brown resin having a low viscosity, an OH number of 530 and an alkaline reaction, is formed.

EXPERIMENT 3

The phenolic resin component from Experiments 1 and 2 is halogenated, the side chains being lengthened at the same time. No degradation products are obtained in this reaction.

Materials employed and amounts:

| | Moles | Batch parts by weight | Parts by weight 100 |
|---|---|---|---|
| Basic resin (OH number 530) | approx. 1 | 900.0 | 55.4 |
| Tetrachlorophthalic anhydride | 2.1 | 600.0 | 36.9 |
| Propylene oxide | 2.1 | 124.0 | 7.6 |
| | | 1.624.0 | 99.9 |
| Yield | | 100% | |

The resin, together with the anhydride, is stirred at a temperature of 130° C under a blanket of nitrogen in a heatable stirred reactor until a clear melt has formed. The half-esterification has ended when, after approximately 4 hours, the acid number no longer rises. This is the case at an acid number of 51 ± 3. In this phase, the resin has a very high viscosity and it is desirable that the subsequent propoxylation is carried out as described in Experiment 1.

Depending on the characteristics of the reactor, the propoxylation has ended after 2 to 4 hours. The reaction is monitored by checking the falling acid number. The highly viscous, yellowish-brown end product has the following values:
 acid number: 0.3
 OH number: 280 ± 5

EXPERIMENT 4

Analogously to the halogenation and enlargement of the molecule in Experiment 3, the bromine derivatives can also be employed in place of the chlorine component.

| Materials employed and amounts: | | | |
|---|---|---|---|
| | Moles | Batch parts by weight | Parts by weight 100 |
| Basic resin (OH number 530) | approx. 1 | 900.0 | 63.3 |
| Tetrabromophthalic anhydride | 1 | 463.7 | 32.6 |
| Propylene oxide | 1 | 58.1 | 4.1 |
| Yield | | 1,421.8 100% | 100.0 |

The resin, together with the anhydride, is stirred at a temperature of 130° C under a blanket of nitrogen in a heatable stirred reactor until a clear melt has formed. 6 parts by weight of sodium acetate are added as the catalyst. The half-esterification has ended when, after approximately 4 hours, the acid number no longer rises. This is the case at an acid number of 51 ± 3. In this phase, the resin has a very high viscosity and it is desirable that the subsequent propoxylation is carried out as described in Experiment 1.

Depending on the characteristics of the reactor, the propoxylation has ended after 2 to 4 hours. The reaction is monitored by checking the falling acid number. The undissolved Na salt is allowed to settle and the resin is decanted off. The highly viscous, yellowish-brown end product has the following values:
 acid number: 0.2
 OH number: 312

EXPERIMENT 5

It is also possible to manufacture condensation products which are built up around a phosphorus atom, by modifying the Mannich reaction. These built-in phosphonate esters are stable to hydrolysis and, due to their high phosphorus content, are particularly effective as flame-retarders in rigid polyurethane foams. Moreover, it represents a valuable addition to the system since, as a phosphorus derivative in combination with the halogenated polyethers, it has a synergistic flame-retarding action.

The phosphonate ester is manufactured in a stirred reactor which is designed for exothermic liquid/liquid reactions and can be heated and cooled.

| Materials employed and amounts: | | | |
|---|---|---|---|
| | Moles | Batch parts by weight | Parts by weight 100 |
| Diethyl phosphite | 1.00 | 138.100 | 40.79 |
| Diethanolamine | 1.05 | 110.397 | 32.60 |
| Formalin 35% strength | 1.05 | 90.090 | 26.61 |
| | | | 100.00 |
| Total employed | | 338.587 | |
| Distillate | | 83.333 | |
| Yield | | 255.254 | |

The phosphite together with the amine, is first introduced at room temperature under a blanket of nitrogen. The formalin solution is added dropwise continuously in such a way that the exothermic effect levels out at 90 + 2° C. The reaction is allowed to continue for a further 60 minutes and the temperature is then lowered to 70° C. The water of reaction and the excess feed materials are then distilled off at 12 mm Hg.

The product is a yellow oil having a low viscosity and the following characteristics:
 acid number <5
 OH number approx. 450
 phosphorus content 12.2 - 13.6%
 viscosity at 23° C <200 cps

EXPERIMENT 6

A more advantageous manufacture of the phosphonate ester becomes possible when paraformaldehyde is employed in place of the formalin solution according to Experiment 5.

| Materials employed and amounts: | | | |
|---|---|---|---|
| | Moles | Batch parts by weight | Parts by weight 100 |
| Diethyl phosphite | 1.00 | 138.100 | 49.3 |
| Diethanolamine | 1.05 | 110.397 | 39.4 |
| Paraformaldehyde | 1.05 | 31.531 | 11.3 |
| | | | 100.0 |
| Total employed | | 280.028 | |
| Distillate | | 24.774 | |
| Yield | | 255.254 | |

The phosphite is first introduced, together with the paraformaldehyde, under a blanket of nitrogen and a clear solution is prepared at room temperature. The amine is continuously added dropwise in such a way that the exothermic reaction does not exceed 90° ± 2° C. The reaction has ended after 30 minutes. The temperature is lowered to 70° C and excess feed products and the water of reaction are distilled off at 12 mm Hg.

The product is a yellow oil having a low viscosity and the following characteristics:
 acid number: <5
 OH number: 450
 phosphorus content: 12.2 - 13.6%
 viscosity at 23° C:200 cps

EXPERIMENT 7

Preparation of 2,4,6-tris-(dimethylamino)-methyl-phenol

| Materials employed and amounts: | | | |
|---|---|---|---|
| | Moles | Batch parts by weight | Parts by weight 100 |
| Phenol | 1 | 94.11 | 17.87 |
| Paraformaldehyde | 3.03 | 90.99 | 17.28 |
| Dimethylamine (40% strength solution | 3.03 | 341.56 | 64.85 |
| | | | 100.00 |
| Total employed | | 526.66 parts by weight | |
| Distillate | | 258.21 parts by weight | |
| Yield | | >90% of theory | |

The phenol is placed, together with the paraformaldehyde, under a blanket of nitrogen in a stirred reactor which can be heated and cooled. The exothermic reaction is initiated by metering in the amine solution. At this stage, the reaction temperature must not exceed 50° C. Depending on the type of reactor, the reaction is complete after 60 to 90 minutes. The reaction is allowed to continue under reflux (94° C) for a further 30 to 60 minutes and the excess feed materials and the water are then stripped off in vacuo. The yellow liquid is distilled over at a boiling point of 130° - 160° C/1 mm Hg. A second distillation gives a pale yellow liquid. This fraction has a strength of >96% and density of
 $D_{25}^{25}$: 0.97 - 0.98.

EXPERIMENT 8

A flameproofed resin is formed by mixing the resin from Experiment 1 or 2 with the phosphonate ester from Experiment 5 or 6, at about 50° C, in the following ratio:

| resin | 87.0 parts by weight |
|---|---|
| phosphonate ester | 13.0 parts by weight |
| | 100.0 parts by weight |

The material does not segregate and is stable for many months when stored under cool and dry conditions.

EXPERIMENT 9

A more highly flameproofed resin is produced by the synergistic effect of the proportions of chlorine and phosphorus. For this purpose, the components from Experiments 3 and 5 are mixed, at about 50° C, in the following ratio:

| Cl resin | 92.0 parts by weight |
|---|---|
| phosphonate ester | 8.0 parts by weight |
| | 100.0 parts by weight |

The mixture is stable when stored under cool and dry conditions.

EXPERIMENT 10

A very highly flameproofed resin is produced by mixing the brominated resin from Experiment 4 with the phosphonate ester from Experiment 5.

For this purpose, the components are mixed, at about 50° C, in the following ratio:

| Br resin | 92.0 parts by weight |
|---|---|
| phosphonate ester | 8.0 parts by weight |
| | 100.0 parts by weight |

The mixture is stable when stored under cool and dry conditions.

The Examples which follow illustrate the invention without, however, limiting it thereto. The Examples were carried out with the phenolic resin component, prepared according to Experiment 1, as the polyol. Analogous results are obtained when the other starting components described in the above experiments are employed.

The polyisocyanate employed in Examples 1 to 13 is diphenylmethanediisocyanate (MDI) having a NCO content of 30% and an isocyanate proportion of about 50%, for example Desmodur 44 V 20 of Bayer AG.

EXAMPLE 1

(comparative example without addition of metal powder)

50 parts by weight of the phenolic resin component are mixed with 0.5 part by weight of silicone oil 193 of Dow-Corning. 50 parts by weight of the polyisocyanate are added thereto and the mass is vigorously stirred. A non-porous material having a density of 580 kg/m$^3$ and a Shore A hardness of 90 – 96 is produced.

EXAMPLE 2

50 parts by weight of the phenolic resin component are mixed with 0.5 part by weight of silicone oil 193 of Dow-Corning and 10 parts by weight of aluminum powder having a particle size of 5 $\mu$ and with 50 parts by weight of the polyisocyanate. A foam having a density of 309 kg/m$^3$ and a Shore A hardness of 85 – 90 is produced.

EXAMPLE 3

50 parts by weight of the phenolic resin component, 0.5 part by weight of silicone oil 193 of Dow-Corning and 10 parts by weight of aluminum powder having a particle size of 5 $\mu$ are vigorously stirred with 50 parts by weight of the polyisocyanate which had previously been mixed with 10 parts by weight of titanium dioxide. A foam having a density of 270 kg/m$^3$ and a Shore A hardness of 80 – 85 is produced.

EXAMPLE 4

41.32 parts by weight of the phenolic resin component, 8.26 parts by weight of titanium dioxide and 0.41 part by weight of silicone oil 193 of Dow-Corning are vigorously stirred with 45 parts by weight of the polyisocyanate to which 5 parts by weight of selenium powder had previously been admixed. A foam having a density of 150 kg/m$^3$ and a Shore A hardness of 50 – 55 is produced.

EXAMPLE 5

41.32 parts by weight of the phenolic resin component, 8.26 parts by weight of titanium dioxide and 0.41 part by weight of silicone oil 193 of Dow-Corning are vigorously stirred with 45 parts by weight of the polyisocyanate to which 5 parts by weight of zinc dust had previously been admixed. A foam having a density of 133 kg/m$^3$ and a Shore A hardness of 40 – 45 is produced.

EXAMPLE 6

41.32 parts by weight of the phenolic resin component, 8.26 parts by weight of titanium dioxide and 0.41 part by weight of silicone oil 193 of Dow-Corning are vigorously stirred with 41.6 parts of the polyisocyanate to which 8.4 parts by weight of aluminum powder had previously been added. A foam having a density of 275 kg/m$^3$ and a Shore A hardness of 80 – 85 is produced.

EXAMPLE 7

Example 6 was modified in that, instead of 8.4 parts by weight of aluminum powder, 12.5 parts by weight of aluminum powder were introduced. This produced a foam having a density of 286 kg/m$^3$ and a Shore A hardness of 80 – 85.

EXAMPLE 8

Example 6 was modified in that, instead of 8.4 parts by weight of aluminum powder, 16.7 parts by weight of aluminum powder were introduced. This produced a foam having a density of 327 kg/m$^3$ and a Shore A hardness of 85 – 90.

EXAMPLE 9

Example 6 was modified in that, instead of 8.4 parts by weight of aluminum powder, 25 parts by weight of aluminum powder were introduced. This produced a foam having a density of 390 kg/m$^3$ and a Shore A hardness of 85 – 90.

EXAMPLE 10

Example 6 was modified in that, instead of 8.4 parts by weight of aluminum powder, 29.2 parts by weight of aluminum powder were introduced. This produced a foam having a density of 474 kg/m³ and a Shore A hardness of 85 – 90.

EXAMPLE 11

41.32 parts by weight of the phenolic resin component, 8.26 parts by weight of titanium dioxide and 0.41 part by weight of silicone oil 193 of Dow-Corning are vigorously stirred with 41.66 parts by weight of the polyisocyanate to which 4.17 parts by weight of aluminum powder having a particle size of 5 μ and 4.17 parts by weight of sodium carbonate ($Na_2CO_3$) had previously been admixed. A foam having a density of 141 kg/m³ and a Shore A hardness of 38 – 43 is produced.

EXAMPLE 12

41.32 parts by weight of resin and 0.4 part by weight of silicone oil 193 of Dow-Corning are vigorously stirred for a short time with 41.7 parts by weight of the polyisocyanate to short time with 41.7 parts by weight of the polyisocyanate to which 4.2 parts by weight of ammonium carbonate and 4.2 parts by weight of aluminum powder having a particle size of 5 μ had previously been admixed. With evolution of heat, this produced a foam having a density of 150 kg/m³ and a Shore A hardness of 45 – 50.

EXAMPLE 13

In this example, the only difference over the preceding example is that the same amount of sodium carbonate is employed in place of the ammonium carbonate. The resulting foam then has a density of 337 kg/m³ and a Shore A hardness of 85 – 90.

What we claim is:

1. A process for the manufacture of a foam based on a phenolic resin having an OH number of from 300 to 600 and being an oxyalkylated mannich condensation product of the basic formula

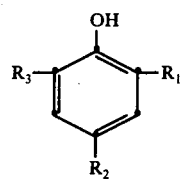

where the radicals $R_1$, $R_2$ and $R_3$ are identical or different and denote

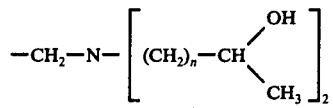

where $n$ represents an integer from 1 to 6, said process comprising reacting said product with an organic diisocyanate or polyisocyanate or mixtures thereof, in the presence of a blowing agent consisting essentially of a gas produced by metal powder or a metal powder and a metal oxide powder, wherein the metal of the metal powder and the metal of the metal oxide powder are selected from the group consisting of aluminum, selenium, zinc, vanadium, manganese, cobalt, nickel, copper, chromium and mixtures thereof.

2. A process as defined in claim 1, wherein the oxyalkylated mannich condensation product is modified by reaction with tetrachloro- or tetrabromophthalic acid anhydride.

3. A process as defined in the claim 1, wherein the isocyanate component is a polymethylene polyphenyl polyisocyanate.

4. A process as defined in the claim 1, wherein the isocyanate component is a diphenylmethane diisocyanate.

5. A process as defined in the claim 1, wherein the isocyanate component employed is a mixture of higher-functional polyisocyanates with more than two benzene rings in the molecule.

* * * * *